(12) United States Patent
Busse et al.

(10) Patent No.: US 12,233,884 B2
(45) Date of Patent: Feb. 25, 2025

(54) MODEL PREDICTIVE CONTROL OF MULTIPLE COMPONENTS OF A MOTOR VEHICLE

(71) Applicant: ZF Friedrichshafen AG, Friedrichshafen (DE)

(72) Inventors: Timon Busse, Munich (DE); Matthias Friedl, Friedrichshafen (DE); Timo Wehlen, Friedrichshafen (DE); Valerie Engel, Markdorf (DE); Christian Baumann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 153 days.

(21) Appl. No.: 17/776,903

(22) PCT Filed: Nov. 14, 2019

(86) PCT No.: PCT/EP2019/081322
§ 371 (c)(1),
(2) Date: May 13, 2022

(87) PCT Pub. No.: WO2021/093953
PCT Pub. Date: May 20, 2021

(65) Prior Publication Data
US 2022/0402508 A1   Dec. 22, 2022

(51) Int. Cl.
*B60W 10/08* (2006.01)
*B60W 10/18* (2012.01)
*B60W 50/00* (2006.01)

(52) U.S. Cl.
CPC ........ *B60W 50/0097* (2013.01); *B60W 10/08* (2013.01); *B60W 10/18* (2013.01);
(Continued)

(58) Field of Classification Search
None
See application file for complete search history.

(56) References Cited

U.S. PATENT DOCUMENTS

| 6,487,477 | B1 | 11/2002 | Woestman et al. |
| 10,060,370 | B2 * | 8/2018 | D'Amato .............. B60W 10/00 |

(Continued)

FOREIGN PATENT DOCUMENTS

| CN | 102981408 A | 3/2013 |
| CN | 106997172 A | 8/2017 |

(Continued)

OTHER PUBLICATIONS

International Search Report (English Translation) PCT/EP2019/081322, dated Jul. 9, 2020. (2 pages).

(Continued)

*Primary Examiner* — James M McPherson
(74) *Attorney, Agent, or Firm* — Dority & Manning, P.A.

(57) ABSTRACT

A processor unit (3) is configured for executing an MPC algorithm (13) for model predictive control of a first component (18) of a motor vehicle (1) and of a second component (19) of the motor vehicle (1). The MPC algorithm (13) includes a cost function (15) to be minimized and a dynamic model (14) of the motor vehicle (1). The dynamic model (14) includes a loss model (27) of the motor vehicle (1). The loss model (27) describes an overall loss of the motor vehicle (1). The cost function (15) includes a first term, which represents the overall loss of the motor vehicle (1). The overall loss depends on a combination of operating values, which includes a first value of a first operating parameter and a second value of a second operating parameter. The processor unit (3) is also configured for determining, by executing the MPC algorithm (13) as a function of (Continued)

the loss model (14), that combination of operating values, by which the first term of the cost function (15) is minimized.

8 Claims, 2 Drawing Sheets

(52) U.S. Cl.
CPC .............. *B60W 2050/0022* (2013.01); *B60W 2050/0031* (2013.01); *B60W 2510/08* (2013.01); *B60W 2510/18* (2013.01)

(56) References Cited

U.S. PATENT DOCUMENTS

| | | |
|---|---|---|
| 10,156,197 B1 | 12/2018 | Jin et al. |
| 2011/0066308 A1* | 3/2011 | Yang ............... B60W 10/08 701/22 |
| 2016/0096527 A1 | 4/2016 | D'Amato et al. |
| 2016/0244077 A1 | 9/2016 | Di Cairano et al. |
| 2018/0363580 A1 | 12/2018 | Jin et al. |
| 2019/0155229 A1 | 5/2019 | Herrera |
| 2019/0375394 A1* | 12/2019 | Maleki ............... B60W 20/11 |
| 2019/0378041 A1* | 12/2019 | Dhansri ............... B60W 30/14 |
| 2021/0129853 A1* | 5/2021 | Appleton ............. G06Q 10/047 |
| 2021/0213933 A1* | 7/2021 | Borrelli ................. B60K 6/485 |
| 2022/0185326 A1* | 6/2022 | Isele ................ B60W 60/0015 |

FOREIGN PATENT DOCUMENTS

| | | |
|---|---|---|
| CN | 106716337 A | 5/2019 |
| DE | 102018114336 A1 | 12/2018 |
| DE | 102018217845 A1 | 5/2019 |
| EP | 1256476 B1 | 11/2010 |
| EP | 2610836 A1 | 7/2013 |
| EP | 2918439 A2 | 9/2015 |
| GB | 2568548 A | 5/2019 |

OTHER PUBLICATIONS

Wikipedia: "Model Predictive Control", Mar. 9, 2018 (English Translation) Retrieved from the Internet: https://de.wikipedia.org/wiki/Model_Predictive_Control [retrieved on Jul. 7, 2020], XP002799657 section: mode of operation.
German Search Report for Application No. 102019217578.3 Dated Aug. 29, 2024.
Chinese Office Action for Application No. 201980101144.7 Dated Nov. 14, 2019.
Chinese Office Action dated Dec. 20, 2024 for Application No. 201980101144.7.

* cited by examiner

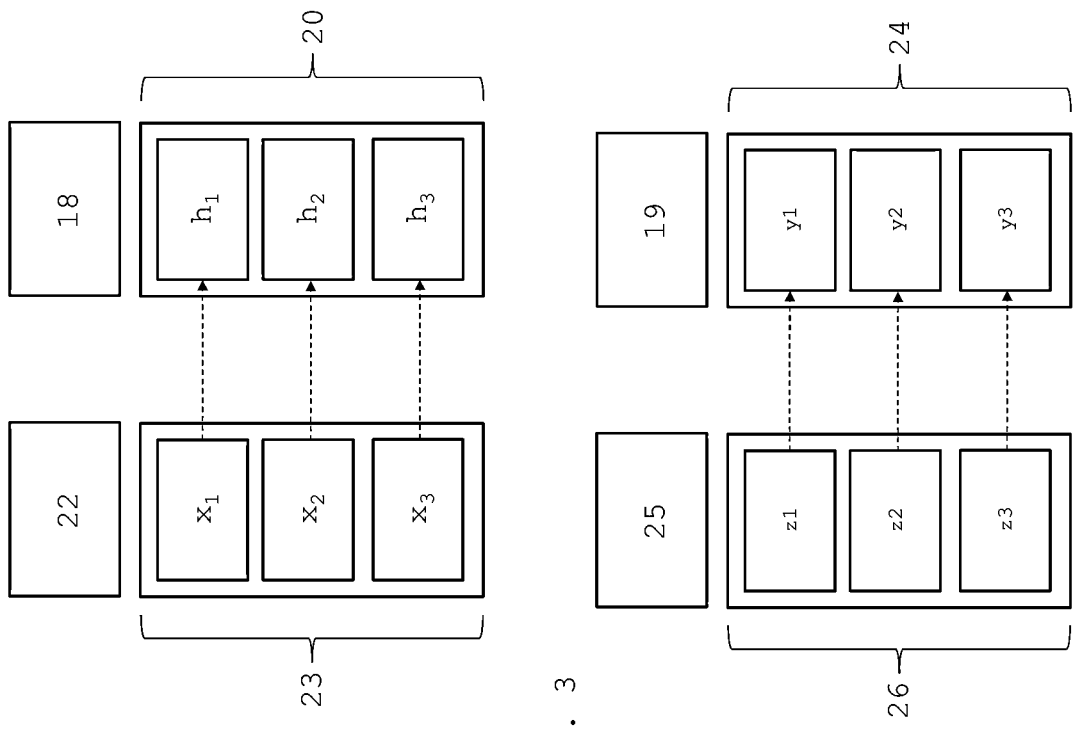
Fig. 2
Fig. 3
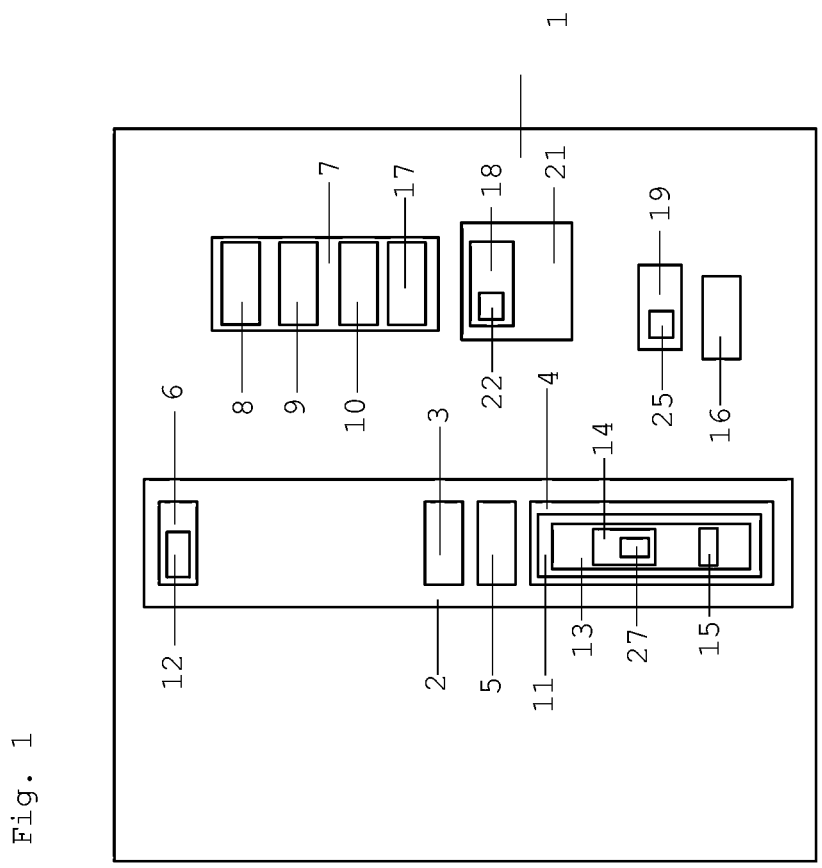
Fig. 1

MODEL PREDICTIVE CONTROL OF MULTIPLE COMPONENTS OF A MOTOR VEHICLE

CROSS-REFERENCE TO RELATED APPLICATION

The present application is a U.S. national phase of PCT/EP2019/081322 filed in the European Patent Office on Nov. 14, 2019, which is incorporated by reference in its entirety for all purposes.

FIELD OF THE INVENTION

The invention relates generally to model predictive control of multiple components of a motor vehicle.

BACKGROUND

Methods of model predictive control (MPC) are utilized in the field of closed-loop trajectory control, for example, in the area of closed-loop motor control in motor vehicles. For example, EP2610836 A1 describes an optimization of an energy management strategy based on a prediction horizon and further surroundings information by minimizing a cost function. In the process, a neural network is created for use in the vehicle and a modeling of the driver and a prediction of the speed profile likely selected by the driver are carried out. Moreover, EP1256476 B1 discloses a strategy for reducing the energy demand during driving and for increasing the range. In the process, navigation unit information is utilized, namely a current vehicle position, road patterns, geography with date and time, altitude changes, speed limits, intersection density, traffic control, and driving patterns of the driver.

US 2018/0363580 A1 teaches a method for the open-loop control of an actuator system of a motor vehicle. The method includes utilizing a module for model predictive control (MPC) module with an MPC solver to determine optimal positions of a plurality of actuators subject to constraints. In addition, a cost function is optimized for a set of actuator duty cycles for controlling positions of the plurality of actuators, wherein it is determined whether the MPC solver has determined optimal actuator positions for the plurality of actuators. Moreover, a linear quadratic regulator (LQR) solution is applied if the MPC solver fails to determine optimal actuator positions for the plurality of actuators.

GB 2568548A describes a method for the open-loop control of a vehicle using a model predictive control scheme. This includes predicting a first parameter of a vehicle state at each of a plurality of points in time, i.e, a trajectory, as a function of a first parameter, for example, a direction, a current vehicle state, and a first vehicle model. A second parameter is predicted, for example, the position, of the vehicle state at each of the multiple points in time as a function of a second parameter of the current vehicle state, the multiple predictions of the first parameter of the vehicle state, and a second vehicle model. Control inputs for the vehicle are determined at each of the points in time as a function of the predictions of the first and second parameters of the vehicle trajectory at each of the multiple points in time and desired first and second parameters of the vehicle trajectory at each of the multiple points in time. The control inputs can aim to minimize a cost function associated with the models.

U.S. Ser. No. 10/060,370B2, furthermore, describes a method and systems for the route planning of vehicles on the basis of an adaptive predictive model control. In one example, a method includes the real-time online identification of the vehicle model on the basis of the vehicle inputs and outputs. In addition, the input space is compressed to increase the optimization efficiency and the route planning is optimized. Moreover, the route planning is optimized on the basis of the model parameter of the vehicle and the known road inclination.

SUMMARY OF THE INVENTION

Example aspects of the present invention provide an MPC for multiple efficiency-relevant components of a motor vehicle, wherein the components are not necessarily to be found in a drive train of the motor vehicle.

Example aspects of the present invention provide the utilization of an MPC solver for planning various efficiency-relevant degrees of freedom at the overall vehicle level. In the process, more efficient (and more convenient) combinations of actuator systems can be identified by utilizing an MPC solver for planning various efficiency-relevant degrees of freedom. Thereafter, the optimal degree-of-freedom planning can be transmitted to a target generator, which can be implemented, in particular, by a software module.

Highly diverse, efficiency-relevant components are installed in modern motor vehicles, wherein these are not necessarily to be found only in the drive train. Example aspects of the present invention enable a reduction of the overall losses of the motor vehicle, for example, due to an intelligent regulation of the ride height of the motor vehicle or due to an intelligent activation of the brakes of the motor vehicle. Depending on the type of the motor vehicle, a list results of efficiency-relevant components (for example, a height-adjustable vehicle) and degrees of freedom (for example, the set height of the chassis), which encompasses highly diverse parts of the overall "vehicle" system. Example aspects of the present invention makes it possible to select and implement an optimal combination of actuator systems of the available degrees of freedom. In this connection, the following cost function can optimally represent the best possible solution to the minimization problem min $(f_{cost}=c_{efficiency}+c_{time}+c_{comfort})$, wherein the individual terms of the cost function $f_{cost}$ describe the parameterizable costs with respect to efficiency, comfort, and travel time.

The subject matter of the invention is, thus, the general expansion of the degrees of freedom that are plannable by the MPC solver. In this context, not only is the trajectory planning, but also the general planning of further efficiency-relevant degrees of freedom is left up to the MPC solver. In this connection, the solver makes use of an extensive vehicle loss model, with the aid of which any number of combinations of actuator systems can be evaluated with respect to the overall costs $f_{cost}$. The MPC solver identifies the solution that has the optimal value for the aforementioned minimization problem and, in particular, subsequently transmits the optimal degrees-of-freedom planning to the target generator.

In this sense, according to a first example aspect of the invention, a processor unit is provided for the model predictive control of multiple components of a motor vehicle. The processor unit is configured for executing an MPC algorithm for the model predictive control of a first component of a motor vehicle and of a second component of the motor vehicle. The method of model predictive control (MPC) was selected in order to find, in any situation under established marginal conditions and constraints, an optimal solution for a "driving efficiency" driving function, which is to provide an efficient driving style. The MPC method is based on a system model that describes the behavior of the system. In addition, the MPC method is based on an objective function or on a cost function that describes an optimization problem and determines which state variables are to be minimized.

The first component can be operated with different values of a first operating parameter and the second component can be operated with different values of a second operating parameter. The present invention is not limited to the planning and closed-loop control of the degrees of freedom for the first component and the second component. The motor vehicle can include components in addition to the first component and the second component, the degrees of freedom of which can be planned and controlled, by way of a closed-loop system, in the same way as explained in greater detail for the first component and the second component.

The MPC algorithm includes a cost function to be minimized and a dynamic model of the motor vehicle, in particular a longitudinal dynamic model of the motor vehicle, wherein the dynamic model includes a loss model of the motor vehicle. The dynamic model, in particular the longitudinal dynamic model of the drive train of the motor vehicle, can include a vehicle model with vehicle parameters and drive train losses (in part, approximated characteristic maps). In particular, the first component can be represented and calculated or simulated by the dynamic model with the different values of the first operating parameter and the second component can be represented and calculated or simulated by the dynamic model with the different values of the second operating parameter.

In addition, findings regarding upcoming route topographies (for example, curves and uphill grades) can be incorporated into the dynamic model, in particular into the longitudinal dynamic model of the drive train. In addition, findings regarding speed limits on the upcoming route can also be incorporated into the dynamic model of the drive train. The loss model can include a list of efficiency-relevant components (for example, a height-adjustable vehicle or a system configured therefor) and degrees of freedom (for example, the set height of the chassis), which encompasses highly diverse parts of the overall "motor vehicle" system. The loss model therefore describes an overall loss of the motor vehicle. The degrees of freedom are the operating parameters of the components. "Components" according to the present invention include, for example, actuators that are utilized for steering and damping the motor vehicle. In addition, in particular, the braking system and the drive train can form components according to the present invention.

The cost function includes a first term ("$c_{efficiency}$"; see the aforementioned cost function $f_{cost}$), which represents the overall loss of the motor vehicle. The overall loss of the motor vehicle depends on a combination of operating values, which includes a first value of the first operating parameter and a second value of the second operating parameter. In addition, the cost function can include further terms ("$c_{time}$", "$c_{comfort}$"; see the aforementioned cost function $f_{cost}$), some of the advantageous ones of which are described in greater detail further below. The processor unit is configured for determining, by executing the MPC algorithm as a function of the loss model, that combination of operating values, by which at least the first term ("$c_{efficiency}$") of the cost function is minimized. In addition, due to this determined combination of operating values, the overall cost function can also be minimized (min ($f_{cost}=c_{efficieny}+c_{time}+c_{comfort}$)).

For this purpose, the MPC algorithm can include an MPC solver in the form of a software module. The MPC solver can include instructions or program code, as the result of which the processor unit is instructed to determine, as a function of the loss model, the combination of operating values such that the cost function or at least the first term ("$c_{efficiency}$") is minimized. In this way, example aspects of the present invention make it possible to select and implement an optimal combination of operating values or also a combination of actuator systems of the available degrees of freedom.

Example aspects of the present invention can be utilized, in particular, for an autonomous driving function of the motor vehicle. The autonomous driving function enables the motor vehicle to travel autonomously, i.e, without a vehicle occupant controlling the motor vehicle. The driver has handed over the control of the motor vehicle to the driver assistance system. Thus, the autonomous driving function includes the motor vehicle being configured—in particular by the central processor unit—for carrying out, for example, steering, turn-signaling, acceleration, and braking maneuvers without human intervention and controlling, by an open-loop system, in particular, external lighting and signaling, such as turn-signal lights of the motor vehicle. The autonomous driving functions can also include driving functions that assist a driver of the motor vehicle in the control of the motor vehicle, in particular during steering, turn-signaling, acceleration, and braking maneuvers, wherein the driver still has the control of the motor vehicle.

The processor unit can transmit the optimized combination of operating values to a software module ("target generator"). By this software module, the processor unit can convert the mathematically optimal planning of all available degrees of freedom into actually evaluatable component signals. By way of example, a speed trajectory of the vehicle can be optimally planned by the MPC for the next five thousand meters (5000 m). In this case, the target generator would "convert" the first (=actually necessary) speed value of this trajectory, for example, into a demand torque of the electric machine (as an efficiency-relevant component) of the motor vehicle. The component software can then operate with this value and regulate the intended speed.

In this sense, the processor unit in one example embodiment is configured for controlling a first actuator of the first component, by executing a conversion software module, such that the first actuator is operated with a first actuator value, as the result of which the first component is operated with the first value of the first operating parameter of that combination of operating values, by which at least the first term of the cost function is minimized. In addition, the processor unit in this example embodiment is configured for controlling a second actuator of the second component, by executing the conversion software module, such that the second actuator is operated with a second actuator value, as the result of which the second component is operated with the second value of the second operating parameter of that combination of operating values, by which at least the first term of the cost function is minimized. This example embodiment makes it possible that the actuators are controlled by an open-loop system such that the components are operated as efficiently as possible. In other words, an optimal combination of actuator values can be determined and implemented, and so the components and, thus, the motor vehicle as well can be operated as energy-efficiently as possible.

As mentioned above, the present invention is not limited to the first component and to the second component, because highly diverse, efficiency-relevant components are installed in modern vehicles, wherein these components are not necessarily to be found only in the drive train. All these components with their degrees of freedom can be represented by the loss model. In one example embodiment—in particular, in addition to other efficiency-relevant components—the first component can be a system for the level control of the motor vehicle and the second component can be a braking system. A reduction of the overall losses of the motor vehicle can be achieved due to an intelligent regulation of the ride height and/or due to an intelligent activation of the brakes (which takes place due to the determination of the optimal combination of operating values).

The first term includes an electrical energy weighted with a first weighting factor and predicted according to the dynamic model, which is provided within a prediction horizon by a battery of the drive train for driving the electric machine. In addition, the cost function includes, as a second term, a driving time weighted with a second weighting factor and predicted according to the dynamic model, which the motor vehicle needs in order to cover the entire distance predicted within the prediction horizon. The processor unit can be configured for determining an input variable for the electric machine by executing the MPC algorithm as a function of the first term and as a function of the second term such that the cost function is minimized.

The state variables for the "driving efficiency" driving function can therefore be, for example, the vehicle speed or the kinetic energy, the energy remaining in the battery, and the driving time. Energy consumption and driving time can be optimized, for example, on the basis of the uphill grade of the upcoming route and constraints for speed and drive force, and on the basis of the current system state. By the objective function or by the cost function of the "driving efficiency" driving strategy, the driving time can also be minimized in addition to the overall loss or energy consumption. As a result, depending on the selection of the weighting factors, a low speed cannot always be evaluated as optimal and, thus, the problem no longer exists that the resultant speed is always at the lower edge of the permitted speed. It is made possible that the driver influence is no longer relevant for the energy consumption and the driving time of the motor vehicle, because the electric machine can be controlled by the processor unit based on the input variable, which is determined by executing the MPC algorithm. By the input variable, in particular, an optimal prime mover operating point of the electric machine can be set. As a result, a direct regulation of the optimal speed of the motor vehicle can take place.

The cost function can have, in particular, exclusively linear and quadratic terms. As a result, the overall problem has the form of a quadratic optimization with linear constraints and a convex problem results, which can be solved well and quickly. The objective function or the cost function can be formulated with a weighting (weighting factors), wherein, in particular, an energy efficiency, a driving time, and a ride comfort are calculated and weighted. An energy-optimal speed trajectory can be calculated online for an upcoming horizon on the processor unit, which can form, in particular, an integral part of a central control unit of the motor vehicle. By utilizing the MPC method, moreover, the target speed of the motor vehicle can be cyclically recalculated based on the current driving mode and the upcoming route information.

Current state variables can be measured and appropriate data can be recorded and supplied to the MPC algorithm. In this way, route data from an electronic map can be updated, in particular cyclically, for a prediction horizon (for example, four hundred meters (400 m)) ahead of the motor vehicle. The route data can include, for example, uphill grade information, curve information, and information regarding speed limits. Moreover, a curve curvature can be converted, via a maximum permissible lateral acceleration, into a speed limit for the motor vehicle. In addition, a position finding of the motor vehicle can be carried out, in particular via a GNSS signal for the precise localization on the electronic map.

A minimization of the driving time for the prediction horizon and a minimization of consumed energy are carried out by the cost function of the MPC algorithm. In one example embodiment, a minimization of torque changes for the prediction horizon is also carried out. With respect to the input for the model predictive control, for example, speed limits, physical limits for the torque, and rotational speeds of the electric machine can be supplied to the MPC algorithm as constraints. In addition, control variables for the optimization can be supplied to the MPC algorithm as input, in particular the speed of the vehicle (which can be proportional to the rotational speed), the torque of the electric machine, and the state of charge of the battery. As the output of the optimization, the MPC algorithm can yield an optimal rotational speed and an optimal torque for calculated points in the prediction horizon. With respect to the implementation of the MPC in the vehicle, a software module can be connected downstream from the MPC algorithm, which determines a currently relevant state and transmits this to a power electronics unit.

Energy consumption and driving time can both be evaluated and weighted at the end of the horizon. This term is therefore active only for the last point of the horizon. In this sense, the cost function in one example embodiment includes an energy consumption final value weighted with the first weighting factor, which the predicted electrical energy assumes at the end of the prediction horizon, and the cost function includes a driving time final value weighted with the second weighting factor, which the predicted driving time assumes at the end of the prediction horizon.

In order to ensure comfortable driving, additional terms can be introduced for penalizing torque surges. In this sense, the cost function can include a third term having a third weighting factor, wherein the third term includes a value of a torque predicted according to the dynamic model, which the electric machine provides for driving the motor vehicle, and wherein the processor unit is configured for determining the input variable for the electric machine by executing the MPC algorithm as a function of the first term, as a function of the second term, and as a function of the third term such that the cost function is minimized.

For the first point in the horizon, the deviation from the most recently set torque can be evaluated as negative in order to ensure that there is a seamless and smooth transition during the change-over between an old trajectory and a new trajectory. In this sense, the third term can include a first value—weighted with the third weighting factor—of a torque predicted according to the dynamic model, which the electric machine provides for driving the motor vehicle to a first waypoint within the prediction horizon. The third term can include a zeroth value—weighted with the third weighting factor—of a torque that the electric machine provides for driving the motor vehicle to a zeroth waypoint, which is situated directly ahead of the first waypoint. The zeroth torque can be, in particular, a real—not merely predicted—torque provided by the electric machine. In the cost function, the zeroth value of the torque can be subtracted from the first value of the torque.

Alternatively, the third term can include a first value—weighted with the third weighting factor—of a drive force predicted according to the dynamic model, which the electric machine provides for driving the motor vehicle to a first waypoint within the prediction horizon. The third term includes a zeroth value—weighted with the third weighting factor—of a drive force that the electric machine provides for driving the motor vehicle to a zeroth waypoint, which is situated directly ahead of the first waypoint, wherein, in the cost function, the zeroth value of the drive force is subtracted from the first value of the drive force.

The waypoints that are taken into account by the MPC algorithm are, in particular, discrete waypoints that follow one another at a certain frequency. In this sense, the zeroth waypoint and the first waypoint represent discrete waypoints, wherein the first waypoint immediately follows the zeroth waypoint. The zeroth waypoint can be situated before the prediction horizon. The zeroth torque value can be measured or determined for the zeroth waypoint. The first waypoint represents, in particular, the first waypoint within the prediction horizon. The first torque value can be predicted for the first waypoint. Therefore, the actually determined zeroth torque value can be compared with the predicted first torque value.

Additionally, excessively high torque gradients within the horizon are disadvantageous, and so, in one example embodiment, these excessively high torque gradients are already penalized in the objective function. For this purpose, the quadratic deviation of the drive force per meter can be weighted and minimized in the objective function. In this sense, the cost function can include a fourth term having a fourth weighting factor, wherein the fourth term includes a gradient of the torque predicted according to the dynamic model or an indicator value for a gradient of the torque predicted according to the dynamic model. The processor unit is configured for determining the input variable for the electric machine by executing the MPC algorithm as a function of the first term, as a function of the second term, as a function of the third term, and as a function of the fourth term such that the cost function is minimized.

In one example embodiment, the fourth term includes a quadratic deviation of the gradient of the torque, which has been multiplied by the fourth weighting factor and summed. In addition, the cost function can include a quadratic deviation—which has been summed with the fourth weighting factor—of a drive force that the electric machine provides in order to propel the motor vehicle one meter in the longitudinal direction. In this sense, the fourth term can include a quadratic deviation—which has been multiplied by the fourth weighting factor and summed—of a drive force that the electric machine provides in order to propel the motor vehicle one meter in the longitudinal direction.

Speed limits, which can be established, for example, by road traffic regulations, are hard limits for the optimization, which are not to be exceeded. A slight exceedance of the speed limits is always permissible in reality and tends to be the normal case primarily during transitions from one speed zone into a second zone. In dynamic surroundings, in which speed limits shift from one computing cycle to the next computing cycle, it can happen, in the case of very hard limits, that a valid solution for a speed profile can no longer be found. In order to increase the stability of the computational algorithm, a soft constraint can be introduced into the objective function. In particular, a slack variable can become active in a predefined narrow range before the hard speed limit is reached. Solutions that are situated very close to this speed limit can be evaluated as poorer, i.e, solutions, the speed trajectory of which maintains a certain distance to the hard limit. In this sense, the cost function can include, as a fifth term, a slack variable weighted with a fifth weighting factor, wherein the processor unit is configured for determining the input variable for the electric machine by executing the MPC algorithm as a function of the first term, as a function of the second term, as a function of the third term, as a function of the fourth term, and as a function of the fifth term such that the cost function is minimized.

According to a second example aspect of the invention, a motor vehicle is provided, which includes a processor unit according to the first example aspect of the invention. The motor vehicle also includes a driver assistance system, a first component, and a second component. The driver assistance system is configured for accessing, in particular by a communication interface, a combination of operating values minimizing the first term of the cost function, which has been determined by the processor unit and includes a first value of the first operating parameter and a second value of the second operating parameter. In addition, the vehicle assistance system is configured for controlling the first component based on the first value of the first operating parameter and for controlling the second component based on the second value of the second operating parameter. For this purpose, the driver assistance system can access, in particular, the above-described target generator.

The vehicle is, for example, an automobile (for example, a passenger car having a weight of less than three and a half tons (3.5 t)), a motorcycle, a motor scooter, a moped, a bicycle, an e-bike, a bus, or a truck (for example, having a weight of more than three and a half tons (3.5 t)), or also a rail vehicle, a ship, or an aircraft, such as a helicopter or an airplane. The invention can also be utilized in small, lightweight electric motor vehicles for micromobility, wherein these motor vehicles are utilized, in particular, in city traffic and for the first mile and the last mile in rural areas. The first mile and the last mile can be understood as all routes and paths that are located in the first and last links of a mobility chain. This is, for example, the path from home to the train station or the route from the train station to the workplace. In other words, the invention is usable in all areas of transportation, such as automotive, aviation, nautical science, astronautics, etc. The motor vehicle can belong, for example, to a vehicle fleet. The motor vehicle can be controlled by a driver, possibly assisted by a driver assistance system. The motor vehicle can also be, for example, remotely controlled and/or (semi-) autonomously controlled, however.

According to a third example aspect of the invention, a method is provided for the model predictive control of multiple components of a motor vehicle, wherein a first component can be operated with different values of a first operating parameter, and wherein a second component can be operated with different values of a second operating parameter. The method includes executing an MPC algorithm for the model predictive control of the first component and of the second component. The MPC algorithm includes a cost function to be minimized and a dynamic model of the motor vehicle, in particular a longitudinal dynamic model of the motor vehicle, wherein the dynamic model includes a loss model of the motor vehicle, and wherein the loss model describes an overall loss of the motor vehicle. In addition, the cost function includes a first term, which represents the overall loss of the motor vehicle. Moreover, the overall loss depends on a combination of operating values, which includes a first value of the first operating parameter and a second value of the second operating parameter. According to one further method step, by executing the MPC algorithm as a function of the loss model, that combination of operating values is determined, by which the first term of the cost function is minimized.

According to a fourth example aspect of the invention, a computer program product is provided for the model predictive control of multiple components of a motor vehicle, wherein a first component can be operated with different values of a first operating parameter, and wherein a second component can be operated with different values of a second operating parameter. The computer program product, when run on a processor unit, instructs the processor unit to execute an MPC algorithm for the model predictive control of the first component and of the second component. The MPC algorithm includes a cost function to be minimized and a dynamic model of the motor vehicle, in particular a longitudinal dynamic model of the motor vehicle, wherein the dynamic model includes a loss model of the motor vehicle, and wherein the loss model describes an overall loss of the motor vehicle. In addition, the cost function includes a first term, which represents the overall loss of the motor vehicle. Moreover, the overall loss depends on a combination of operating values, which includes a first value of the first operating parameter and a second value of the second operating parameter. In addition, the computer program product, when run on a processor unit, instructs the processor unit to determine, by executing the MPC algorithm as a function of the loss model, that combination of operating values, by which the first term of the cost function is minimized.

The comments made in conjunction with the processor unit according to the first example aspect of the invention also apply similarly for the motor vehicle according to the second example aspect of the invention, for the method according to the third example aspect of the invention, and for the computer program product according to the fourth example aspect of the invention.

BRIEF DESCRIPTION OF THE DRAWINGS

Exemplary embodiments of the invention are explained in greater detail in the following with reference to the diagrammatic drawings, wherein identical or similar elements are labeled with the same reference numbers, wherein FIG. 1 shows a schematic of a motor vehicle, which includes multiple efficiency-relevant components, FIG. 2 shows degrees of freedom of a first efficiency-relevant component, FIG. 3 shows degrees of freedom of a second efficiency-relevant component.

DETAILED DESCRIPTION

Figure 4:
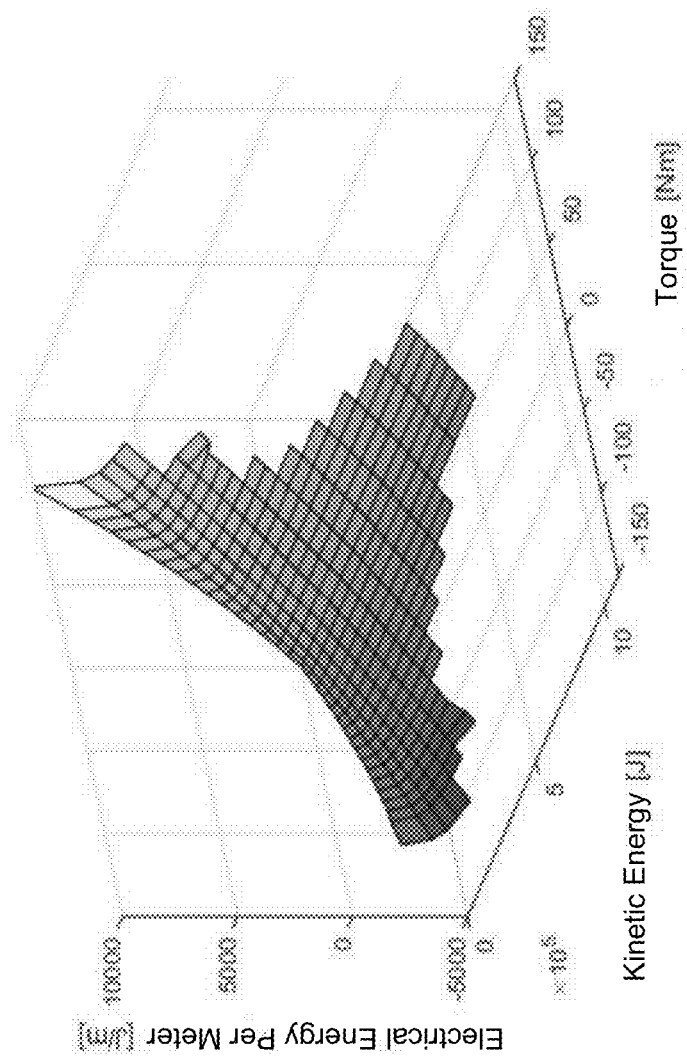
FIG. 4 shows a characteristic map of an electric machine for the vehicle according to FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1, for example, a passenger car. The motor vehicle 1 includes a system 2 for the model predictive control of multiple components of the motor vehicle 1. The system 2 in the exemplary embodiment shown includes a processor unit 3, a memory unit 4, a communication interface 5, and a detection unit 6, in particular for detecting state data related to the motor vehicle 1. The motor vehicle 1 also includes a drive train 7, which can include, for example, an electric machine 8, which can be operated as a motor and as a generator, a battery 9, and a transmission 10. The electric machine 8, in the motor mode, can drive wheels of the motor vehicle 1 via the transmission 10, which can have, for example, a constant ratio. The battery 9 can provide the electrical energy necessary therefor. The battery 9 can be charged by the electric machine 8 when the electric machine 8 is operated in the generator mode (recuperation). Optionally, the battery 9 can also be charged at an external charging station. Likewise, the drive train of the motor vehicle 1 can optionally include an internal combustion engine 17, which, alternatively or in addition to the electric machine 8, can drive the motor vehicle 1. The internal combustion engine 17 can also drive the electric machine 8 in order to charge the battery 9.

The motor vehicle 1 also includes multiple components that are relevant for the efficiency of the operation of the motor vehicle 1 ("efficiency-relevant components"), in particular when the motor vehicle 1 is operated in an autonomous traveling mode. These components are not arranged exclusively in the drive train 7 of the motor vehicle 1. In FIG. 1, purely by way of example, a first component 18 and a second component 19 are represented, although the motor vehicle 1 still includes a number of further efficiency-relevant components. In the exemplary embodiment according to FIG. 1, a first component is represented in the form of a system 18 for the level control of the motor vehicle 1 and a second component is represented in the form of a braking system 19 of the motor vehicle 1. For example, the electric machine 8, the battery 9, the transmission 10, and the internal combustion engine 17 can also be construed as efficiency-relevant components of the motor vehicle 1.

FIG. 2 shows that the system 18 for the level control of the motor vehicle 1 can be operated with different values of a first operating parameter 20 (first degree of freedom). For example, the first operating parameter 20 can be the set height of a chassis 21 of the motor vehicle 1. Purely by way of example, the set height of the chassis 21 of the motor vehicle 1 can assume a first value $h_1$, a second value $h_2$, and a third value $h_3$. The different heights $h_1$, $h_2$, and $h_3$ of the chassis 21 can result in a different level of a drag force of the motor vehicle 1 in each case. This can be represented by the longitudinal model 14 of the drive train 7 of the motor vehicle 1 described further below.

The system 18 for the level control of the motor vehicle 1 can be construed as an actuator of the motor vehicle 1. In addition, the system 18 for the level control of the motor vehicle 1 itself can include at least one actuator 22 (for example, a hydraulic cylinder or a pneumatic cylinder or a hydro-pneumatic shock absorber), which the system 18 actuates for the level control of the motor vehicle 1. The first actuator 22 can be operated with different actuator values 23, and so the different values $h_1$, $h_2$, and $h_3$ result for the system 18 for the level control of the motor vehicle 1. For example, a first actuator value $x_1$ (for example, a first pressure value for a hydraulic cylinder) yields the first height $h_1$ of the chassis 21, a second actuator value $x_2$ yields the second height $h_2$ of the chassis 21, and a third actuator value $x_3$ yields the third height $h_3$ of the chassis 21.

FIG. 3 shows that the braking system 19 can be operated with different values of a second operating parameter 24

(second degree of freedom). For example, the second operating parameter 24 can be the braking force of the braking system 19. Purely by way of example, the braking force can assume a first value $y_1$, a second value $y_2$, and a third value $y_3$. The different levels of the braking forces $y_1$, $y_2$, and $y_3$ of the braking system 19 can result in a different level of a traction force, in each case, that is exerted by the braking system upon the wheels of the motor vehicle 1. This can be represented by the longitudinal model 14 of the drive train 7 of the motor vehicle 1 described further below.

The braking system 19 can be construed as an actuator of the motor vehicle 1. In addition, the braking system 19 itself can include an actuator 25 (for example, a hydraulic cylinder), which actuates the braking system 19. The second actuator 25 can be operated with different actuator values 26, and so the different values $y_1$, $y_2$, and $y_3$ result for the braking system 19. For example, a first actuator value $z_1$ yields the first braking force $y_1$, a second actuator value $z_2$ yields the second braking force $y_2$, and a third actuator value $z_3$ yields the third braking force $y_3$.

A computer program product 11 can be stored on the memory unit 4. The computer program product 11 can be run on the processor unit 3, for the purpose of which the processor unit 3 and the memory unit 4 are connected to each other by the communication interface 5. When the computer program product 11 is run on the processor unit 3, it instructs the processor unit 3 to perform the functions described in conjunction with the drawing and/or to carry out method steps.

The computer program product 11 includes an MPC algorithm 13. The MPC algorithm 13 includes a dynamic model of the motor vehicle, namely a longitudinal dynamic model 14 of the drive train 7 of the motor vehicle 1 in the exemplary embodiment shown. In addition, the MPC algorithm 13 includes a cost function 15 to be minimized, wherein a first term $c_{efficiency}$ of the cost function 15 represents the overall loss of the motor vehicle 1. Therefore, the cost function 15 to be minimized can be expressed mathematically as follows:

$$\min(c_{efficiency}+c_{time}+c_{comfort})$$

Wherein:
$c_{efficiency}$ represents the parameterizable costs with respect to efficiency,
$c_{time}$ represents the parameterizable costs with respect to the travel time, and
$c_{comfort}$ represents the parameterizable costs with respect to comfort.

The longitudinal dynamic model 14 includes a loss model 27 of the motor vehicle 1. The loss model 27 describes the operating behavior of the efficiency-relevant components 18, 19 with respect to their efficiency and with respect to their loss. This yields the overall loss of the motor vehicle 1. The processor unit 3 executes the MPC algorithm 13 and, in so doing, predicts a behavior of the motor vehicle 1 based on the longitudinal dynamic model 14, wherein the cost function 15 is minimized.

The overall loss of the motor vehicle 1 depends on a combination of operating values. The combination of operating values includes a first value of the first operating parameter and a second value of the second operating parameter. In the simplified exemplary embodiment shown, there are six possible combinations of operating values. A first combination of operating values includes the first height $h_1$ of the chassis 21 and the first braking force $y_1$ of the braking system 19. The first combination of operating values yields a first overall loss of the motor vehicle 1. A second combination of operating values includes the first height $h_1$ of the chassis 21 and the second braking force $y_2$ of the braking system 19. The second combination of operating values yields a second overall loss of the motor vehicle 1. A third combination of operating values includes the first height $h_1$ of the chassis 21 and the third braking force $y_3$ of the braking system 19. The third combination of operating values yields a third overall loss of the motor vehicle 1. A fourth combination of the operating values includes the second height $h_2$ of the chassis 21 and the first braking force $y_1$ of the braking system 19. The fourth combination of operating values yields a fourth overall loss of the motor vehicle 1. A fifth combination of operating values includes the second height $h_2$ of the chassis 21 and the third braking force $y_3$ of the braking system 19. The fifth combination of operating values yields a fifth overall loss of the motor vehicle 1. A sixth combination of operating values includes the third height $h_3$ of the chassis 21 and the third braking force $y_3$ of the braking system 19. The sixth combination of operating values yields a sixth overall loss of the motor vehicle 1.

The processor unit 3 can determine the aforementioned six combinations of operating values by executing the MPC algorithm 13 as a function of the loss model 14. The processor unit 3 can compare the overall losses resulting from the six different combinations of operating values with one another. The processor unit 3 can establish, for example, that the third combination of operating values ($h_1$; $y_3$) results in the lowest overall loss of the motor vehicle 1. The processor unit 3 can select the third combination of operating values and output the appropriate values, for example, at a target generator, which can be integrated as a software module, the MPC algorithm. Alternatively, the target generator can also be included, for example, as a software module in a driver assistance system 16. Based on the determined combination of operating values ($h_1$; $y_3$), the first component 18 can be regulated to the first value $h_1$ of the first operating parameter 20 and the second component 19 can be regulated to the third value $y_3$ of the second operating parameter 24, in particular by the target generator. In addition, the processor unit 3 can also regulate the first actuator 22 to the first actuator value $x_1$, and so the first value $h_1$ of the first operating parameter 20 sets in for the first component 18. In a similar way, the processor unit 3 can regulate the second actuator 25 to the third actuator value $z_3$, and so the third value $y_3$ value of the second operating parameter 24 sets in for the second component 19.

In addition, an optimal rotational speed and an optimal torque of the electric machine 8 for calculated points in the prediction horizon can result as the output of the optimization by the MPC algorithm 13. For this purpose, the processor unit 3 can determine an input variable for the electric machine 8, and so the optimal rotational speed and the optimal torque set in. The processor unit 3 can control, by way of an open-loop system, the electric machine 8 based on the determined input variable. In addition, this can also be carried out by the driver assistance system 16, however.

The detection unit 6 can measure current state variables of the motor vehicle 1, record appropriate data, and supply these to the MPC algorithm 13. In addition, route data from an electronic map can be updated, in particular cyclically, for a prediction horizon (for example, four hundred meters (400 m)) ahead of the motor vehicle 1. The route data can include, for example, uphill grade information, curve information, and information regarding speed limits. Moreover, a curve curvature can be converted, via a maximum permissible lateral acceleration, into a speed limit for the motor vehicle 1. In addition, a position finding of the motor vehicle can be carried out by the detection unit 6, in particular via a signal generated by a GNSS sensor 12 for the precise localization on the electronic map. Moreover, the detection unit for detecting the external surroundings of the motor vehicle 1 can include, for example, a radar sensor, a camera system, and/or a LIDAR sensor. The processor unit 3 can access information of the aforementioned elements, for example, via the communication interface 5. This information can be incorporated into the longitudinal model 14 of the motor vehicle 1, in particular as restrictions or constraints.

The longitudinal dynamic model 14 of the motor vehicle 1 can be expressed mathematically as follows:

$$\frac{dv(t)}{dt} = (F_{trac}(t) - F_r(\alpha(t)) - F_{gr}(\alpha(t)) - F_d(v(t)))/m_{eq}$$

Wherein:

v is the speed of the motor vehicle;

$F_{trac}$ is the tractive force exerted by the prime mover or the brakes upon the wheels of the motor vehicle, for example, influenced by the above-described different levels of braking forces $y_1$, $y_2$, and $y_3$ of the braking system 19;

$F_r$ is the rolling resistance, which is an effect of the deformation of the tires during rolling and depends on the load of the wheels (on the normal force between the wheel and the road) and, thus, on the inclination angle of the road;

$F_{gr}$ is the gradient resistance, which describes the longitudinal component of gravity, which acts upon the vehicle during operation uphill or downhill, depending on the inclination of the roadway;

$F_d$ is the drag force of the motor vehicle, for example, influenced by the above-described different heights $h_1$, $h_2$, and $h_3$ of the chassis 21; and $m_{eq}$ is the equivalent mass of the motor vehicle; the equivalent mass includes, in particular, the inertia of the turned parts of the drive train, which are subjected to the acceleration of the motor vehicle (prime mover, transmission input shafts, wheels).

By converting time dependence into distance dependence $$\frac{d}{ds} = \frac{d}{dt} * \frac{dt}{ds} = \frac{d}{dt} * \frac{1}{v}$$

and coordinate transformation in order to eliminate the quadratic speed term in the aerodynamic drag with $$e_{kin} = \frac{1}{2} * m_{eq} * v(t)^2,$$

the result is $$\frac{de_{kin}}{ds} = F_{trac}(s) - F_r(\alpha(s)) - F_{gr}(\alpha(s)) - F_d(e_{kin}(s)).$$

In order to ensure that the problem is quickly and easily solvable by the MPC algorithm 13, the dynamic equation of the longitudinal dynamic model 14 can be linearized, in that the speed is expressed, via coordinate transformation, by kinetic energy $de_{kin}$. As a result, the quadratic term for calculating the aerodynamic drag $F_d$ is replaced by a linear term and, simultaneously, the longitudinal dynamic model 14 of the motor vehicle 1 is no longer described as a function of time, as usual, but rather as a function of distance. This fits well with the optimization problem, since the predictive information of the electric horizon is based on distance.

In addition to the kinetic energy, there are two further state variables, which, within the scope of a simple optimization problem, can also be described in a linear and distance-dependent manner. On the one hand, the electrical energy consumption of the drive train 7 is usually described in the form of a characteristic map as a function of torque and prime mover speed. In the exemplary embodiment shown, the motor vehicle 1 has a fixed ratio between the electric machine 8 and the road, on which the motor vehicle 1 moves. As a result, the rotational speed of the electric machine 8 can be directly converted into a speed of the motor vehicle 1 or even into a kinetic energy of the motor vehicle 1. In addition, the electrical power of the electric machine 8 can be converted into energy consumption per meter via division by the appropriate speed. As a result, the characteristic map of the electric machine 8 obtains the form shown in FIG. 4. In order to be able to utilize this characteristic map for the optimization, it is linearly approximated: $\text{Energy}_{perMeter} \geq a_i * e_{kin} b_i * F_{trac}$ for all i.

In detail, the cost function 15 to be minimized can be expressed mathematically as follows:

$$\min\left( c_{efficiency} - w_{Bat} \cdot (s_E) + w_{Time} \cdot T(s_E) + w_{Tem} \cdot \sum_{s=1}^{s_E-1} \left(\frac{F_A(s) - F_A(s-1)}{\Delta s}\right)^2 + \right.$$

$$\left. w_{TemStart} \cdot (F_A(s_1) - F_A(s_0))^2 + \sum_{s=1}^{s_E-1} w_{Slack} \cdot Var_{slack} \right)$$

Wherein:

$c_{efficiency}$ represents the parameterizable efficiency costs of the efficiency-relevant components, for example, the above-described components 19, 20, $w_{Bat}$ is the weighting factor for the energy consumption of the battery $E_{Bat}$ is the energy consumption of the battery S is the distance $S_{E-1}$ is the distance one time step before the end of the prediction horizon $F_A$ is the drive force that is provided by the electric machine, transmitted by a transmission at a constant ratio, and applied at a wheel of the motor vehicle $W_{Tem}$ is the weighting factor for torque gradients $W_{TemStart}$ is the weighting factor for torque surges T is the time that the vehicle needs in order to cover the entire distance predicted within the prediction horizon $w_{Time}$ is the weighting factor for the time T $S_E$ is the distance to the end of the horizon $w_{Slack}$ is the weighting factor for the slack variable $Var_{Slack}$ is the slack variable The cost function 15 has exclusively linear and quadratic terms. As a result, the overall problem has the form of a quadratic optimization with linear constraints and a convex problem results, which can be solved well and quickly.

The cost function 15 includes, in addition to the above-described parameterizable efficiency costs of the components 19, 20, as one further term, an electrical energy $E_{Bat}$ weighted with a first weighting factor $w_{Bat}$ and predicted according to the longitudinal dynamic model, which is provided within a prediction horizon by the battery 9 of the drive train 7 for driving the electric machine 8. The battery 9 and the electric machine 8 can be construed as efficiency-relevant components of the motor vehicle 1, similarly to the above-described system 18 for level control and the above-described braking system 19. Correspondingly, the electrical energy $E_{Bat}$ weighted with the first weighting factor $w_{Bat}$ and predicted according to the longitudinal dynamic model can also be incorporated into the term $c_{efficiency}$.

The cost function 15 includes, as one further term, a driving time T weighted with a second weighting factor $W_{Time}$ and predicted according to the longitudinal dynamic model 14, which the motor vehicle 1 needs in order to cover the predicted distance. As a result, depending on the selection of the weighting factors, a low speed cannot always be evaluated as optimal and, thus, the problem no longer exists that the resultant speed is always at the lower edge of the permitted speed.

The energy consumption and the driving time can both be evaluated and weighted at the end of the horizon. These terms are therefore active only for the last point of the horizon.

Excessively high torque gradients within the horizon are disadvantageous. Therefore, torque gradients are already penalized in the cost function 15, namely by the term $$w_{Tem} \cdot \sum_{k=1}^{s_E-1} \left( \frac{F_A(s) - F_A(s-1)}{\Delta s} \right)^2.$$

The quadratic deviation of the drive force per meter is weighted with a weighting factor $W_{Tem}$ and minimized in the cost function. Alternatively to the drive force $F_A$ per meter, the torque $M_{EM}$ provided by the electric machine 8 can also be utilized and weighted with the weighting factor $W_{Tem}$, and so the alternative term $$w_{Tem} \cdot \sum_{k=1}^{s_E-1} \left( \frac{M_{EM}(s) - M_{EM}(s-1)}{\Delta s} \right)^2$$

results. Due to the constant ratio of the transmission 10, the drive force and the torque are directly proportional to one another.

In order to ensure comfortable driving, one further term is introduced in the cost function 15 for penalizing torque surges, namely $w_{TemStart} \cdot (F_A(s_1) - F_A(s_0))^2$. Alternatively to the drive force $F_A$, the torque $M_{EM}$ provided by the electric machine 8 can also be utilized here, and so the alternative term $w_{TemStart} \cdot (M_{EM}(s_1) - M_{EM}(s_0))^2$ results. For the first point in the prediction horizon, the deviation from the most recently set torque can be evaluated as negative and weighted with a weighting factor $w_{TemStart}$ in order to ensure that there is a seamless and smooth transition during the change-over between an old trajectory and a new trajectory.

Speed limits are hard limits for the optimization that are not permitted to be exceeded. A slight exceedance of the speed limits is always permissible in reality and tends to be the normal case primarily during transitions from one speed zone into a second zone. In dynamic surroundings, where speed limits shift from one computing cycle to the next computing cycle, it can happen, in the case of very hard limits, that a valid solution for a speed profile can no longer be found. In order to increase the stability of the computational algorithm, a soft constraint is introduced into the cost function 15. A slack variable $Var_{Slack}$ weighted with a weighting factor $W_{Slack}$ becomes active in a predefined narrow range before the hard speed limit is reached. Solutions that are situated very close to this speed limit are evaluated as poorer, i.e. solutions, the speed trajectory of which maintains a certain distance to the hard limit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS $h_1$ first value of first operating parameter
$h_2$ second value of first operating parameter
$h_3$ third value of first operating parameter
$x_1$ first actuator value of the first actuator
$x_2$ second actuator value of the first actuator
$x_3$ third actuator value of the first actuator
$y_1$ first value of second operating parameter
$y_2$ second value of second operating parameter
$y_3$ third value of second operating parameter
$z_1$ first actuator value of the second actuator
$z_2$ second actuator value of the second actuator
$z_3$ third actuator value of the second actuator
1 vehicle
2 system
3 processor unit
4 memory unit
5 communication interface
6 detection unit
7 drive train
8 electric machine
9 battery
10 transmission
11 computer program product
12 GNSS sensor
13 MPC algorithm
14 longitudinal dynamic model
15 cost function
16 driver assistance system
17 internal combustion engine
18 system for the level control
19 braking system
20 first operating parameter
21 chassis
22 first actuator
23 actuator values of the first actuator
24 second operating parameter
25 second actuator
26 actuator values of the second actuator
27 loss model

The invention claimed is:

1. A system for model predictive control, MPC, of multiple components (18, 19) of a motor vehicle (1), the system comprising processor unit (3), wherein:

the processor unit (3) is configured for executing an MPC algorithm (13) for model predictive control of a first component (18) of the motor vehicle (1) and of a second component (19) of the motor vehicle (1);

the first component (18) is operable with different values (h1, h2, h3) of a first operating parameter (20), and the second component (19) is operable with different values (y1, y2, y3) of a second operating parameter (24);

the MPC algorithm (13) comprises a cost function (15) to be minimized and a dynamic model (14) of the motor vehicle (1);

the dynamic model (14) comprises a loss model (27) of the motor vehicle (1);

the loss model (27) describes an overall loss of the motor vehicle (1);

the cost function (15) comprises a first term representing the overall loss of the motor vehicle (1);

the overall loss depends on a combination of operating values, which includes a first value (h1; h2; h3) of the first operating parameter (20) and a second value (y1; y2; y3) of the second operating parameter (24);

the processor unit (3) is configured for determining, by executing the MPC algorithm (13) as a function of the loss model (14), a combination of operating values that minimizes the first term of the cost function (15);

the first term comprises an electrical energy weighted with a first weighting factor and predicted according to the dynamic model (14), which is provided within a prediction horizon by a battery (9) of a drive train (7) of the motor vehicle (1) for driving an electric machine (8) of the drive train (7);

the cost function (15) comprises, as a second term, a driving time weighted with a second weighting factor and predicted according to the dynamic model (14), which the motor vehicle (1) requires in order to cover an entire distance predicted within the prediction horizon;

the processor unit (3) is configured for determining an input variable for the electric machine (8) by executing the MPC algorithm (13) as a function of the first term and as a function of the second term such that the cost function is minimized; and wherein the processor unit (3), by executing a conversion software module, is configured for
controlling a first actuator (22) of the first component (18) such that the first actuator (22) is operated with a first actuator value (x1; x2; x3), as the result of which the first component (18) is operated with the first value (h1; h2; h3) of the first operating parameter (20) of that combination of operating values, by which the first term of the cost function (15) is minimized, and
controlling a second actuator (25) of the second component (19) such that the second actuator (25) is operated with a second actuator value (z1; z2; z3), as the result of which the second component (19) is operated with the second value (y1; y2; y3) of the second operating parameter (24) of that combination of operating values, by which the first term of the cost function (15) is minimized.

2. The processor unit (3) of claim 1, wherein the first component is a system (18) for level control of the motor vehicle (1), and the second component is a braking system (19) of the motor vehicle (1).

3. The processor unit (3) of claim 1, wherein:
the cost function (15) comprises an energy consumption final value weighted with the first weighting factor, which the predicted electrical energy assumes at the end of the prediction horizon; and the cost function (15) includes a driving time final value weighted with the second weighting factor, which the predicted driving time assumes at the end of the prediction horizon.

4. The processor unit (3) of claim 1, wherein:
the cost function (15) comprises a third term having a third weighting factor;
the third term comprises a value, predicted according to the dynamic model (4), of a torque that the electric machine (8) provides for driving the motor vehicle (1); and
the processor unit (3) is configured for determining the input variable for the electric machine (8) by executing the MPC algorithm (13) as a function of the first term, as a function of the second term, and as a function of the third term such that the cost function (15) is minimized.

5. The processor unit (3) of claim 4, wherein:
the third term comprises a first value, weighted with the third weighting factor, of a torque predicted according to the dynamic model (14), which the electric machine (8) provides for driving the motor vehicle (1) to a first waypoint within the prediction horizon;
the third term comprises a zeroth value, weighted with the third weighting factor, of a torque that the electric machine (8) provides for driving the motor vehicle (1) to a zeroth waypoint, which is situated directly ahead of the first waypoint; and
in the cost function (15), the zeroth value of the torque is subtracted from the first value of the torque.

6. A motor vehicle (3), comprising:
a processor unit (3) for model predictive control, MPC, of multiple components (18, 19) of the motor vehicle (1), wherein
the processor unit (3) is configured for executing an MPC algorithm (13) for model predictive control of a first component (18) of the motor vehicle (1) and of a second component (19) of the motor vehicle (1),
the first component (18) is operable with different values (h1, h2, h3) of a first operating parameter (20), and the second component (19) is operable with different values (y1, y2, y3) of a second operating parameter (24),
the MPC algorithm (13) comprises a cost function (15) to be minimized and a dynamic model (14) of the motor vehicle (1),
the dynamic model (14) comprises a loss model (27) of the motor vehicle (1),
the loss model (27) describes an overall loss of the motor vehicle (1),
the cost function (15) comprises a first term representing the overall loss of the motor vehicle (1),
the overall loss depends on a combination of operating values, which includes a first value (h1; h2; h3) of the first operating parameter (20) and a second value (y1; y2; y3) of the second operating parameter (24),
the processor unit (3) is configured for determining, by executing the MPC algorithm (13) as a function of the loss model (14), a combination of operating values that minimizes the first term of the cost function (15),
the first term comprises an electrical energy weighted with a first weighting factor and predicted according to the dynamic model (14), which is provided within a prediction horizon by a battery (9) of a drive train (7) of the motor vehicle (1) for driving an electric machine (8) of the drive train (7), the cost function (15) comprises, as a second term, a driving time weighted with a second weighting factor and predicted according to the dynamic model (14), which the motor vehicle (1) requires in order to cover an entire distance predicted within the prediction horizon, and the processor unit (3) is configured for determining an input variable for the electric machine (8) by executing the MPC algorithm (13) as a function of the first term and as a function of the second term such that the cost function is minimized;

a driver assistance system (16);

the first component (18); and the second component (19), wherein the driver assistance system (16) is configured for accessing a combination of operating values minimizing the first term of the cost function (15), which has been determined by the processor unit (3) and comprises a first value (h1; h2; h3) of the first operating parameter (20) and a second value (y1; y2; y3) of the second operating parameter (24);

controlling the first component (18) based on the first value (h1; h2; h3) of the first operating parameter (20); and controlling the second component (19) based on the second value (y1; y2; y3) of the second operating parameter (24).

7. A method for the model predictive control, MPC, of multiple components (18, 19) of a motor vehicle (1), a first component (18) operable with different values (h1, h2, h3) of a first operating parameter (20), a second component (19) operable with different values (y1, y2, y3) of a second operating parameter (24), the method comprising:

executing an MPC algorithm (13) while the motor vehicle (1) is travelling for model predictive control of the first component (18) and of the second component (19), wherein the MPC algorithm (13) comprises a cost function (15) to be minimized and a dynamic model (14) of the motor vehicle (1), the dynamic model (14) comprises a loss model (27) of the motor vehicle (1), the loss model (14) describes an overall loss of the motor vehicle (1), the cost function (15) comprises a first term representing the overall loss of the motor vehicle (1), and the overall loss depends on a combination of operating values, which includes a first value (h1; h2; h3) of the first operating parameter (20) and a second value (y1; y2; y3) of the second operating parameter (24);

determining, by executing the MPC algorithm (13) while the motor vehicle (1) is travelling as a function of the loss model (27), a combination of operating values that minimizes the first term of the cost function (15), wherein the first term comprises an electrical energy weighted with a first weighting factor and predicted according to the dynamic model (14), which is provided within a prediction horizon by a battery (9) of a drive train (7) of the motor vehicle (1) for driving an electric machine (8) of the drive train (7), wherein the cost function (15) comprises, as a second term, a driving time weighted with a second weighting factor and predicted according to the dynamic model (14), which the motor vehicle (1) requires in order to cover an entire distance predicted within the prediction horizon, and wherein an input variable for the electric machine (8) is determined by executing the MPC algorithm (13) as a function of the first term and as a function of the second term such that the cost function is minimized, controlling a first actuator (22) of the first component (18) such that the first actuator (22) is operated with a first actuator value (x1; x2; x3), as the result of which the first component (18) is operated with the first value (h1; h2; h3) of the first operating parameter (20) of that combination of operating values, by which the first term of the cost function (15) is minimized; and controlling a second actuator (25) of the second component (19) such that the second actuator (25) is operated with a second actuator value (z1; z2; z3), as the result of which the second component (19) is operated with the second value (v1; v2; y3) of the second operating parameter (24) of that combination of operating values, by which the first term of the cost function (15) is minimized.

8. A computer program product (11) for model predictive control, MPC, of multiple components (18, 19) of a motor vehicle (1), the computer program product (11) comprising instructions stored on a non-transitory memory, a first component (18) operable with different values (h1, h2, h3) of a first operating parameter (20), a second component (19) operable with different values (y1, y2, y3) of a second operating parameter (24), the computer program product (11), when executed on a processor unit (3), instructing the processor unit (3) to:

execute an MPC algorithm (13) for model predictive control of the first component (18) and of the second component (19), the MPC algorithm (13) comprising a cost function (15) to be minimized and a dynamic model (14) of the motor vehicle (1), the dynamic model (14) comprising a loss model (27) of the motor vehicle (1), the loss model (14) describing an overall loss of the motor vehicle (1), the cost function (15) comprising a first term representing the overall loss of the motor vehicle (1), and the overall loss depending on a combination of operating values, which includes a first value (h1; h2; h3) of the first operating parameter (20) and a second value (y1; y2; y3) of the second operating parameter (24);

determine, by executing the MPC algorithm (13) as a function of the loss model (27), a combination of operating values that minimizes the first term of the cost function (15), wherein the first term comprises an electrical energy weighted with a first weighting factor and predicted according to the dynamic model (14), which is provided within a prediction horizon by a battery (9) of a drive train (7) of the motor vehicle (1) for driving an electric machine (8) of the drive train (7), wherein the cost function (15) comprises, as a second term, a driving time weighted with a second weighting factor and predicted according to the dynamic model (14), which the motor vehicle (1) requires in order to cover an entire distance predicted within the prediction horizon, and wherein the computer program product (11), when run on the processor unit (3), instructs the processor unit (3) to determine an input variable for the electric machine (8) by executing the MPC algorithm (13) as a function of the first term and as a function of the second term such that the cost function is minimized; and control a first actuator (22) of the first component (18) such that the first actuator (22) is operated with a first actuator value (x1; x2; x3), as the result of which the first component (18) is operated with the first value (h1;

h2; h3) of the first operating parameter (20) of that combination of operating values, by which the first term of the cost function (15) is minimized; and control a second actuator (25) of the second component (19) such that the second actuator (25) is operated with a second actuator value (z1; z2; z3), as the result of which the second component (19) is operated with the second value (y1; y2; y3) of the second operating parameter (24) of that combination of operating values, by which the first term of the cost function (15) is minimized.

* * * * *